US007558228B2

(12) United States Patent
Lee et al.

(10) Patent No.: US 7,558,228 B2
(45) Date of Patent: Jul. 7, 2009

(54) TRANSMISSION OF CONTROL INFORMATION ACCORDING TO GROUPING OF SERVICES IN A MOBILE COMMUNICATION SYSTEM

(75) Inventors: Young Dae Lee, HaNam-shi (KR); Sung Duck Chun, Anyang (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 11/336,543

(22) Filed: Jan. 19, 2006

(65) Prior Publication Data

US 2006/0176838 A1    Aug. 10, 2006

Related U.S. Application Data

(60) Provisional application No. 60/650,908, filed on Feb. 8, 2005, provisional application No. 60/667,748, filed on Mar. 31, 2005.

(30) Foreign Application Priority Data

Feb. 7, 2005    (KR) ............... 10-2005-0011418

(51) Int. Cl.
*H04H 20/71*    (2008.01)
*H04J 3/00*    (2006.01)
*H04J 3/26*    (2006.01)
*H04W 4/00*    (2009.01)
*H04W 72/00*    (2009.01)
*H04B 7/00*    (2006.01)

(52) U.S. Cl. .............. 370/312; 370/345; 370/432; 455/515; 455/434; 455/450

(58) Field of Classification Search .......... 370/312, 370/345; 455/515, 434, 450
See application file for complete search history.

(56) References Cited

U.S. PATENT DOCUMENTS 6,717,925 B1    4/2004 Leppisaari et al.

(Continued)

FOREIGN PATENT DOCUMENTS

EP    1213939 A1 *  6/2002

(Continued)

OTHER PUBLICATIONS

Author: 3GPP; Title: "Introduction of MBMS", 3GPP TS 25.331; Source: RAN WG2; Date: Nov. 29, 2004; Release 6; pp. 1-138.*

*Primary Examiner*—Nick Corsaro
*Assistant Examiner*—Tangela T. Chambers
(74) *Attorney, Agent, or Firm*—Lee, Hong, Degerman, Kang & Waimey

(57) ABSTRACT

A method of communicating a point-to-multipoint service in a wireless communication system comprises receiving through a control channel a first message comprising a first point-to-multipoint service group identifier associated with a first plurality of point-to-multipoint services for a predetermined area. The method also comprises receiving a second message through the control channel comprising a list of point-to-multipoint service identifiers associated with the first point-to-multipoint service group identifier. The method also comprises processing according to control information received through the control channel if the list of point-to-multipoint service identifiers comprises at least one service that a user equipment is subscribed to. The control channel may be a point-to-multipoint control channel. The first message may comprise a list of point-to-multipoint services associated with modified control information.

8 Claims, 10 Drawing Sheets

U.S. PATENT DOCUMENTS

| | | |
|---|---|---|
| 2002/0077087 A1* | 6/2002 | Li .............................. 455/416 |
| 2003/0012149 A1* | 1/2003 | Maggenti et al. ............ 370/260 |
| 2003/0207696 A1* | 11/2003 | Willenegger et al. ........ 455/522 |
| 2004/0057405 A1* | 3/2004 | Black ......................... 370/335 |
| 2004/0136400 A1 | 7/2004 | Majidi-Ahy et al. |
| 2004/0142706 A1* | 7/2004 | Kim et al. ................... 455/458 |
| 2004/0156332 A1 | 8/2004 | Terry et al. |
| 2004/0180681 A1* | 9/2004 | Jeong et al. ................. 455/503 |
| 2005/0037768 A1* | 2/2005 | Hwang et al. ............... 455/450 |
| 2006/0106865 A1* | 5/2006 | Beming et al. ........... 707/104.1 |
| 2006/0252439 A1* | 11/2006 | Cai ............................ 455/515 |

FOREIGN PATENT DOCUMENTS

| | | |
|---|---|---|
| EP | 1345402 A1 | 9/2003 |
| WO | 2004002184 A1 | 12/2003 |
| WO | 2004017580 A1 | 2/2004 |
| WO | 2004100447 A1 | 11/2004 |

* cited by examiner

US 7,558,228 B2

TRANSMISSION OF CONTROL INFORMATION ACCORDING TO GROUPING OF SERVICES IN A MOBILE COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 2005-011418, filed on Feb. 7, 2005, U.S. Provisional Application No. 60/650,908, filed on Feb. 8, 2005, and U.S. Provisional Application No. 60/667,748, filed on Mar. 31, 2005, the contents of which are hereby incorporated by reference herein in their entirety.

FIELD OF THE INVENTION

The present invention relates generally to a mobile communication system and, more particularly, to transmission of control information in a mobile communication system.

BACKGROUND OF THE INVENTION

FIG. 1 is a block diagram illustrating an exemplary network structure of a universal mobile telecommunications system (UMTS).

Referring to FIG. 1, the universal mobile telecommunications system (UMTS) comprises a user equipment (UE), a UMTS terrestrial radio access network (UTRAN), and a core network (CN). The UTRAN includes at least one radio network sub-system (RNS) and each RNS includes a radio network controller (RNC) and at least one base station (e.g., Node B) managed by the RNC. The Node B comprises at least one cell.

FIG. 2 is an architectural diagram illustrating a radio interface protocol between a UE and a UTRAN based on the 3GPP (3rd Generation Partnership Project) radio access network specifications.

Referring to FIG. 2, the radio interface protocol horizontally includes a physical layer, a data link layer, and a network layer. The radio interface protocol vertically includes a user plane for data information transfer and a control plane for signaling transfer. The protocol layers in FIG. 2 may be divided into L1 (first layer), L2 (second layer), and L3 (third layer) based on the lower three layers of the open system interconnection (OSI) standard model, for example.

The layers depicted in FIG. 2 are described below. The physical layer, as the first layer, provides an information transfer service to an upper layer using physical channels. The physical layer is connected to a medium access control (MAC) layer above the physical layer via transport channels through which data are transferred between the medium access control layer and the physical layer. Data is transmitted between different physical layers, and more particularly, between the physical layer of a transmitting side and the physical layer of a receiving side via physical channels.

The medium access control (MAC) layer of the second layer provides services to a radio link control layer above the MAC layer via logical channels. The radio link control (RLC) layer of the second layer supports reliable data transfer and is operative in segmentation and concatenation of RLC service data units (SDUs) sent down from an upper layer.

A radio resource control (RRC) layer located on the lowest part of the third layer is defined in the control plane only and controls the logical channels, the transport channels, and the physical channels with configuration, reconfiguration, and release of radio bearers (RBs). In this case, the RB includes a service offered by the second layer for the data transfer between the UE and the UTRAN. Generally, configuring RB defines the characteristics of protocol layers and channels necessary for providing a specific service and establishes respective specific parameters and operational methods.

A multimedia broadcast/multicast service (MBMS) is described below. An MBMS offers a streaming or background service to a plurality of UEs using a downlink dedicated MBMS bearer service. An MBMS is provided during one session, and data for the MBMS is transmitted to the plurality of UEs via the MBMS bearer service during an ongoing session only. A UE performs activation first for receiving the MBMS to which the UE has subscribed and receives the activated services only.

The UTRAN provides the MBMS bearer service to at least one UE using radio bearers. The radio bearers used by the UTRAN include point-to-point radio bearers and point-to-multipoint radio bearers. The point-to-point radio bearer is a bi-directional radio bearer and is configured by a logical channel DTCH (dedicated traffic channel), a transport channel DCH (dedicated channel), and a physical channel DPCH (dedicated physical channel) or a physical channel SCCPCH (secondary common control physical channel). The point-to-multipoint radio bearer is a unidirectional downlink radio bearer and is configured by a logical channel MTCH (MBMS traffic channel), a transport channel FACH (forward access channel), and a physical channel SCPCH. The logical channel MTCH is configured for each MBMS offered to one cell and is used for transmitting user-plane data of a specific MBMS to a plurality of UEs.

A logical channel MCCH (MBMS control channel), as shown in FIG. 3, is a point-to-multipoint downlink channel and is used in transmitting control information associated with the MBMS. The logical channel MCCH is mapped to the transport channel FACH (forward access channel), while the transport channel FACH is mapped to the physical channel SCCPCH (secondary common control physical channel). A cell has one MCCH only.

FIG. 3 is a diagram illustrating a point-to-multipoint radio bearer (RB).

Referring to FIG. 3, the point-to-multipoint RB is a unidirectional RB that comprises a logical channel (MTCH: MBMS Traffic CHannel) and a transport channel (FACH: Forward Access CHannel), and a physical channel (SC-CPCH: Secondary Common Control Physical CHannel). The logical channel MTCH is configured for each MBMS service provided to a single cell, and is used for transmitting user plane data of a particular MBMS service to a plurality of users.

The UTRAN that provides MBMS service transmits, to a plurality of terminals, a MBMS-related control message (e.g., a RRC message related to MBMS service data) via a MCCH (MBMS Control CHannel). Examples of an MBMS-related message include a message that informs MBMS service data, and/or a message that informs point-to-multipoint RB data. Referring to FIG. 12, the logical channel MCCH is a point-to-multipoint downlink channel that maps to a transport channel FACH (Forward Access CHannel), which, in turn, maps to a physical channel SCCPCH (Secondary Common Control Physical CHannel). For a single cell, only one MCCH exists.

A terminal wishing to receive a particular MBMS that uses a point-to-multipoint RB first receives, via the MCCH, a RRC message that includes RB data. The point-to-multipoint RB is then established with the terminal using such RB data. Thereafter, the terminal continues to receive the physical channel SCCPCH (e.g., the channel to which the MTCH is mapped) and obtains the data of the particular MBMS service being transmitted via the MTCH.

When one session of a particular MBMS service that uses a point-to-multipoint RB is completed, the UTRAN transmits a message that instructs the release of the point-to-multipoint bearer, via the MCCH to the terminals that are receiving the particular MBMS service. Also, the UTRAN releases the point-to-multipoint RB established at the RNC and Node B. Meanwhile, a terminal that has received the above-identified message releases the point-to-multipoint RB that had been established with the terminal for the particular MBMS service.

While a particular MBMS service is in progress, one or more sessions for that service may occur in sequence. In such case, a session may be defined in various ways. For example, a session may be each complete episode of a multi-episode drama or a session may be certain portions of a sports program, such as scenes that show goals in a soccer match, for example.

When data to be transmitted for a particular MBMS service is generated at the MBMS data source, the core network (CN) informs a session start to the RNC. In contrast, when there is no further data at the MBMS data source to be transmitted for a particular MBMS service, the core network (CN) informs a session stop to the RNC. Between the session start and the session stop, a data transfer procedure for the particular MBMS service may be performed. In such case, only those terminals that have joined a multicast group for the MBMS service may receive data that is transmitted by the data transfer procedure.

In the above session start procedure, the UTRAN that received the session start from the core network (CN) transmits an MBMS notification to the terminals. In such case, MBMS notification refers a function of the UTRAN for informing a terminal that the transmission of data for a particular MBMS service within a certain cell is impending. The UTRAN may use the MBMS notification procedure to perform a counting operation that determines the number of terminals that wish to receive a particular MBMS service within a particular cell. The counting procedure is used to determine whether the radio bearer for providing the particular MBMS service should be set as point-to-multipoint (p-t-m) or point-to-point (p-t-p). To select the MBMS radio bearer, the UTRAN internally establishes a threshold value. After performing the counting function, the UTRAN may set a point-to-point MBMS radio bearer if the number of terminals existing within the corresponding cell is smaller than the threshold value, and may set a point-to-multipoint MBMS radio bearer if the number of terminals existing within the corresponding cell is greater than or equal to the threshold value.

If a point-to-point radio bearer is to be set, the UTRAN allocates a dedicated logical channel to each terminal (UE) and sends the data of the corresponding service. If a point-to-multipoint radio bearer is to be set, the UTRAN uses a downlink common logical channel to send the data of the corresponding service.

FIG. 4 is a diagram illustrating a channel configuration in a UE side for a multimedia broadcast/multicast service (MBMS). FIG. 5 is a diagram illustrating a transmission scheme of MCCH (MBMS control channel) information.

Referring to FIG. 5, the UTRAN providing an MBMS service transmits the MCCH information to a plurality of UEs via the MCCH channel. The MCCH information is periodically transmitted according to a modification period and a repetition period. The MCCH information is categorized into critical information and non-critical information. The non-critical information may be freely modified each modification period and/or each repetition period to be transmitted. The modification of the critical information, however, may only be made at each modification period. Thus, the critical information is repeated one time in each repetition period. However, the modified critical information is only transmitted at a start point of the modification period.

Referring to FIG. 4, the UTRAN periodically transmits a physical channel MICH (MBMS notification indicator channel) to notify whether the MCCH information is updated during the modification period. Accordingly, a UE attempting to receive only a specific MBMS does not receive the MCCH or MTCH until a session of the service begins but receives the MICH periodically. The update of the MCCH information refers to a generation, addition, modification or removal of a specific item of the MCCH information.

Referring again to FIGS. 4-5, once a session of a specific MBMS begins, the UTRAN transmits an NI (notification indicator) through a MICH, which is an indicator of notifying to receive an MCCH channel, to a UE attempting to receive the specific MBMS. The UE having received the NI via the MICH receives an MCCH during a specific modification period indicated by the MICH.

The MCCH information is control information (e.g., RRC messages) associated with an MBMS, and includes MBMS modification services information, MBMS non-modification services information, MBMS point-to-multipoint RB information, and/or access information.

A UE attempting to receive a specific MBMS using a point-to-multipoint radio bearer receives MCCH information including radio bearer information via an MCCH and then configures the point-to-multipoint radio bearer using the received information. After completion of configuring the point-to-multipoint radio bearer, the UE keeps receiving a physical channel SCCPCH to which an MTCH is mapped, to acquire data of the specific MBMS transmitted via the MTCH.

A UTRAN may transmit MBMS data discontinuously via the MTCH. In so doing, the UTRAN periodically transmits a scheduling message via an MSCH (e.g., SCCPCH carrying MTCH), to which an MTCH is mapped, to UEs. The scheduling message informs a transmission start timing point and transmission period of MBMS data transmitted during one scheduling period. For this, the UTRAN previously informs the UE of a transmission period (e.g., a scheduling period) of scheduling information.

When the UTRAN transmits the above-described messages for a specific MBMS, an MBMS service identifier and/or an MBMS transmission identifier for identifying the specific MBMS is included in the message. The MBMS transmission identifier comprises an MBMS session identifier and an MBMS service identifier. For example, when the MBMS modification services information message is transmitted, an MBMS transmission identifier and services information corresponding to the MBMS transmission identifier is included in the message to be transmitted.

If a frequency layer convergence scheme is used in an MBMS and cells using different frequencies are overlapped each other, the UTRAN may make the MBMS provided in cells using a specific frequency. The cells using the specific frequency for the MBMS are called a preferred layer (e.g., PL). A method making UEs receive the MBMS converged into the cells included in a PL is called a frequency layer convergence (FLC) scheme. The FLC scheme may be used in both a hierarchical cell structure (HCS) and a non-hierarchical cell structure. FLC information includes a target frequency (e.g., a frequency of PL) and an offset applied during determining a cell.

However, in the conventional method, when the UTRAN includes information for a plurality of services in a message to be transmitted, MBMS service identifiers and/or MBMS transmission identifiers and information for all the services are included in the message. This causes the volume of the message to increase and may result in waste of radio resources.

SUMMARY OF THE INVENTION

Accordingly, the present invention is directed to transmission of control information in a mobile communication system according to grouping of services that substantially obviates one or more problems due to limitations and disadvantages of the related art.

An object of the present invention is to provide for transmission of control information according to grouping of services in a network side of a mobile communication system to enable efficient use of radio resources when control information for a plurality of services is transmitted.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of communicating a point-to-multipoint service in a wireless communication system comprises receiving through a control channel a first message comprising a first point-to-multipoint service group identifier associated with a first plurality of point-to-multipoint services for a predetermined area. The method also comprises receiving a second message through the control channel comprising a list of point-to-multipoint service identifiers associated with the first point-to-multipoint service group identifier. The method also comprises processing according to control information received through the control channel if the list of point-to-multipoint service identifiers comprises at least one service that a user equipment is subscribed to.

The control channel may be a point-to-multipoint control channel. The first message may comprise a list of point-to-multipoint services associated with modified control information. The second message may comprise a list of point-to-multipoint services associated with unmodified control information. The second message may further comprise a list of point-to-multipoint services associated with modified control information, wherein the list of point-to-multipoint services is associated with the first point-to-multipoint service group identifier. The step of processing according to control information received through the control channel may comprise performing processes determined by the at least one of the first and the second messages. At least one of the first plurality of point-to-multipoint services may be a multimedia broadcast/multicast service (MBMS). The control channel may comprise a MBMS control channel (MCCH). A service group associated with the first point-to-multipoint service group identifier may comprise at least one MBMS transmitted on a carrier frequency, wherein the first point-to-multipoint service group identifier corresponds to an identifier of the carrier frequency. Alternatively, a service group associated with the first point-to-multipoint service group identifier may comprise at least one MBMS using a first set of parameters, wherein the first point-to-multipoint service group identifier corresponds to an identifier of the first set of parameters.

In another embodiment, a method of transmitting a point-to-multipoint service in a wireless communication system comprises transmitting through a control channel a first message comprising a first point-to-multipoint service group identifier associated with a first plurality of point-to-multipoint services for a predetermined area. The method also comprises transmitting a second message through the control channel comprising a list of point-to-multipoint service identifiers associated with the first point-to-multipoint service group identifier so that a user equipment carries out processes according to control information received through the control channel if the list of point-to-multipoint service identifiers includes at least one service that a user equipment is subscribed to.

In yet another embodiment, a mobile station for communicating a point-to-multipoint service in a wireless communication system comprises a receiver adapted to receive through a control channel a first message comprising a first point-to-multipoint service group identifier associated with a first plurality of point-to-multipoint services for a predetermined area, and to receive a second message through the control channel comprising a list of point-to-multipoint service identifiers associated with the first point-to-multipoint service group identifier. The mobile station also comprises a processor adapted to process according to control information received through the control channel if the list of point-to-multipoint service identifiers comprises at least one service that a user equipment is subscribed to.

In still another embodiment, a network for transmitting a point-to-multipoint service in a wireless communication system comprises a transmitter adapted to transmit through a control channel a first message comprising a first point-to-multipoint service group identifier associated with a first plurality of point-to-multipoint services for a predetermined area, and to transmit a second message through the control channel comprising a list of point-to-multipoint service identifiers associated with the first point-to-multipoint service group identifier so that a user equipment carries out processes according to control information received through the control channel if the list of point-to-multipoint service identifiers includes at least one service that a user equipment is subscribed to.

In yet another embodiment, a method of communicating a point-to-multipoint service in a wireless communication system comprises receiving through a control channel a first point-to-multipoint service group identifier that is associated with a first plurality of activated point-to-multipoint services for a network, and receiving a point-to-multipoint service using a first control information. The method also comprises receiving a point-to-multipoint service message comprising at least one of modification service information message and non-modification service information message, wherein the point-to-multipoint service message includes a second point-to-multipoint service group identifier associated with a second plurality of activated point-to-multipoint services and modified control information associated with the second plurality of activated point-to-multipoint services. The method also comprises modifying the first control information of the point-to-multipoint service in response to the modified control information if the second point-to-multipoint service group identifier is associated with the point-to-multipoint service being received by the mobile station.

The service may preferably be a multicast broadcast or multicast service (MBMS).

The service group may preferably be defined by a group to which at least one service belongs.

The identifier and the group identifier may preferably be received from the network via an MCCH (MBMS Control Channel).

Preferably, the identifier may be a transmission identifier or a service identifier for the service and the group identifier is a transmission group identifier or a service group identifier for the service group.

Preferably, the received information may be modification services information which is modified in every modification period and repeatedly transmitted in every repetition period. When the group identifier is included in received modification services information, the UE recognizes that the service has been modified during the modified period.

Preferably, the received information may be non-modification services information which is modified in every modification period and repeatedly transmitted in every repetition period. When the group identifier is included in received non-modification services information, the UE recognizes that the service has not been modified during the modification period.

Preferably, the service group is a group within which at least one MBMS transmitted via a channel is included. The channel is a logical channel, a transport channel or a physical channel. In such case, the group identifier may be identical to an identifier of the channel.

The service group may preferably be a group to which at least one MBMS transmitted on a carrier frequency belongs. In such case, the group identifier may be identical to an identifier of the carrier frequency.

The service group may preferably be a group to which at least one MBMS using the same parameters belongs. In such case, the group identifier of the service group may be identical to an identifier of the parameters.

Preferably, the information including the group identifier may include at least one identifier for at least one service which does not belong to the service group.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention may be embodied in a mobile communication system operating according to the 3GPP (3rd Generation Partnership Project) radio access network specifications. However, the present invention may also be embodied in mobile communication systems operating according to other standards.

Figure 6:
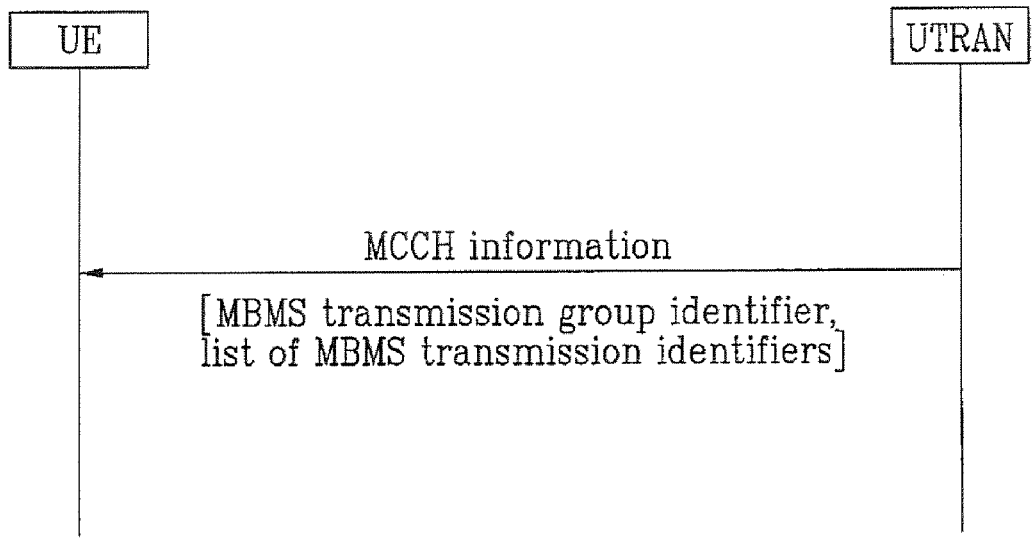
FIG. 6 is a diagram illustrating an information transmission scheme by mapping an MBMS transmission identifier with an MBMS transmission group identifier, according to an embodiment of the present invention.

FIG. 6 is a diagram illustrating an information transmission scheme by mapping an MBMS transmission identifier with an MBMS transmission group identifier, according to an embodiment of the present invention.

Referring to FIG. 6, a UTRAN transmits MCCH information including an MBMS service group and a list of MBMS services belonging to the MBMS service group to at lease one user equipment (UE) through an MCCH channel. The MCCH information further includes a transmission group identifier for the service group and at least one transmission identifier for at least one service belonging to the service group. The at least one UE which receives the MCCH information stores the transmission group identifier and the at least one transmission identifier belonging to the service group. Preferably, the at least one UE stores a transmission identifier for an activated service and a transmission group identifier to which the transmission identifier belongs. Transmission identifiers for inactivated services and transmission group identifiers for service groups to which no activated service belongs may not be stored.

The mapping relation between the transmission group identifier and the transmission identifier may be valid within a specific zone. The specific zone may preferably be a cell. Accordingly, when going out from the specific zone, a UE discards the stored transmission group identifier and the transmission identifiers belonging to the service group. Referring to FIG. 6, the UTRAN may generate information having a scope within which the mapping relation is valid, to be included in the MCCH information that is to be transmitted. In other words, the UTRAN may transmit information related to the scope of cells within which the mapping relation is valid.

The service group comprises at least one service provided through a specific channel which may be one of a SCCPCH, a FACH, and the MTCH. For example, all services transmitted via a SCCPCH may be grouped into a service group. In such a case, the transmission group identifier or the service group identifier identifying the service group may be replaced by an identifier of the SCCPCH. Alternatively, all services transmitted via a FACH may be grouped into a service group. In such a case, the transmission group identifier or the service group identifier identifying the service group may be replaced by an identifier of the FACH.

Alternatively, the service group comprises at least one service provided by at least one cell belonging to a preferred layer (PL) which uses a specific frequency. In such case, the transmission group identifier or the service group identifier identifying the service group may be replaced by an identifier of the specific frequency or the PL.

Alternatively, at least one service using common parameters may be grouped as a service group. In such case, the transmission group identifier or the service group identifier identifying the service group may be replaced by an identifier of the parameters.

The transmission group identifier in FIGS. 1-11 may be replaced by the service group identifier and the MBMS transmission identifier by the MBMS service identifier. The MBMS transmission group identifier is a group of MBMS transmission identifiers, and the MBMS service group identifier is a group of MBMS service identifiers.

Figure 7:
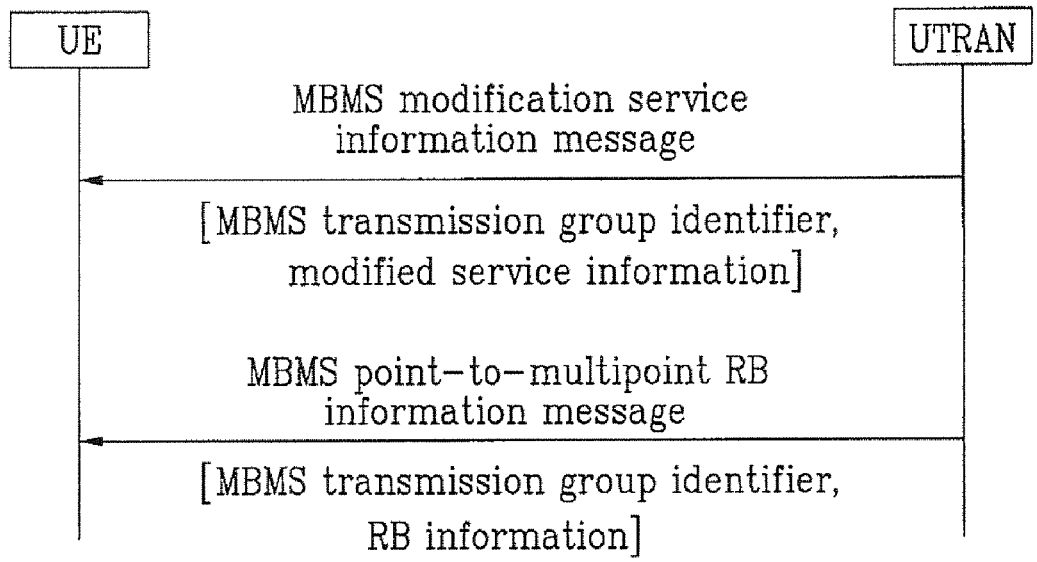
FIG. 7-FIG. 9 are diagrams illustrating transmission and reception schemes of an MBMS transmission group identifier or a service group identifier, according to embodiments of the present invention.
Figure 8:
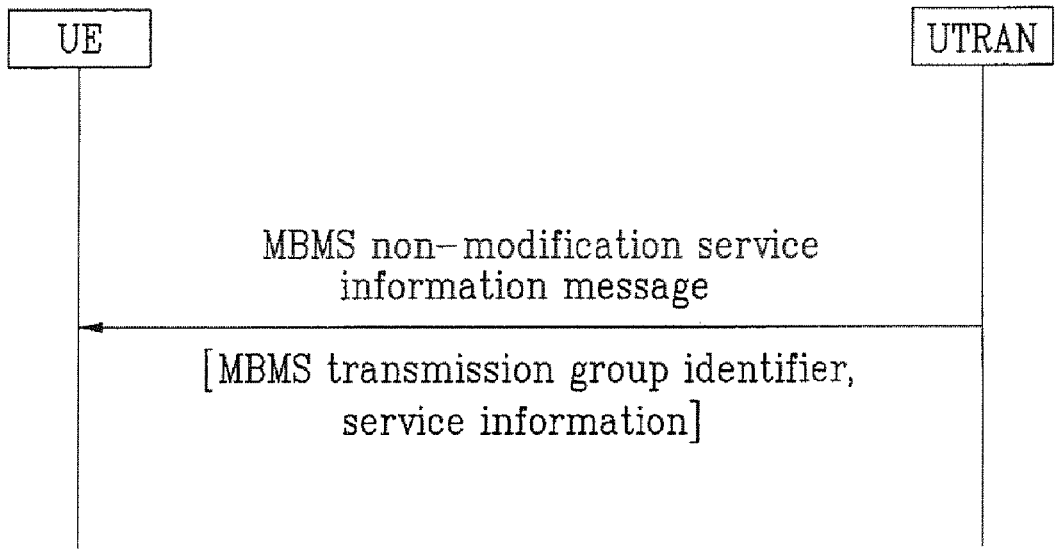
Figure 9:
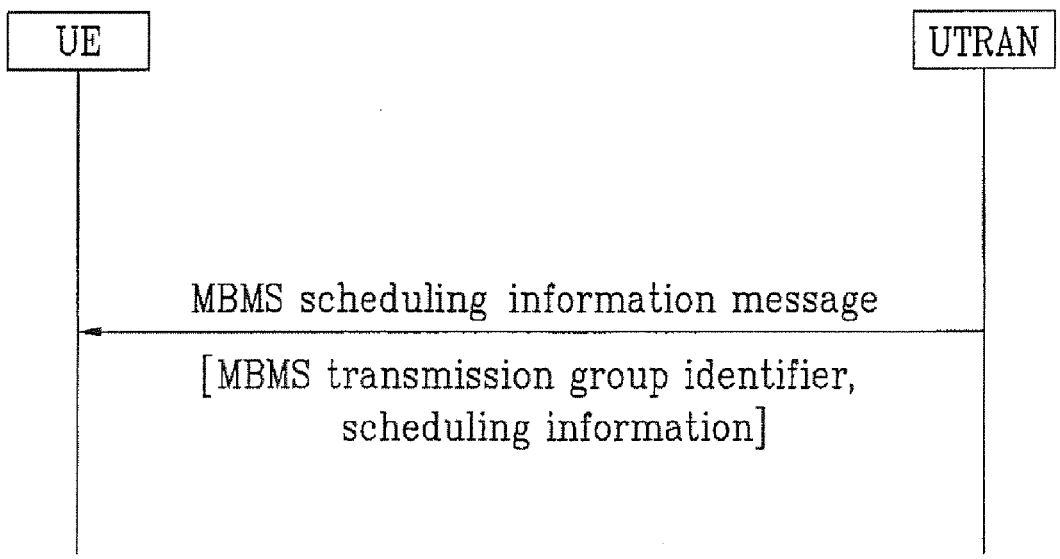

FIGS. 7-9 are signal flow diagrams illustrating transmission and reception schemes of an MBMS transmission group identifier or a service group identifier, according to an embodiment of the present invention.

Referring to FIGS. 7-9, in a preferred embodiment of the present invention, to transmit control information for an MBMS, the UTRAN transmits an MBMS transmission group identifier of a service group to which the MBMS belongs with the control information, instead of transmitting a transmission identifier of the MBMS. Alternatively, an MBMS service identifier of the service group to which the MBMS belongs is transmitted with the control information.

FIG. 7 illustrates an example of transmission scheme of an MBMS modification services information message including an MBMS transmission group identifier. The UTRAN transmits the MBMS modification services information message including services information to be modified and the MBMS transmission group identifier of a service group to which the MBMS belongs. The UE receives the MBMS modification services information message and acquires the MBMS transmission group identifier. The MBMS is identified by the UE based on the acquired transmission group identifier using the transmission group identifier and the list of the transmission identifiers belonging to the transmission group stored in the UE (See FIG. 5). The UE then recognizes that the identified MBMS has been modified during the modification period. The UTRAN then transmits an MBMS point-to-multipoint radio bearer information message including modified point-to-multipoint radio bearer information for the identified MBMS to the UE. The UE applies the received point-to-multipoint radio bearer information to the identified MBMS.

FIG. 8 illustrates an example of transmitting an MBMS non-modification services information message including an MBMS transmission group identifier. The UTRAN transmits the MBMS non-modification services information message including services information and the MBMS transmission group identifier of a service group to which the MBMS belongs. The UE receives the MBMS modification services information message and acquires the MBMS transmission group identifier. The MBMS is identified by the UE based on the acquired transmission group identifier using the transmission group identifier and the list of the transmission identifiers belonging to the transmission group stored in the UE (See FIG. 5). Then the UE recognizes that the identified MBMS has not been modified during the modification period.

FIG. 9 illustrates an example of transmitting an MBMS scheduling information message including an MBMS transmission group identifier. The UTRAN generates scheduling information for a specific transmission group and an MBMS transmission group identifier for identifying the specific transmission group included in the MBMS scheduling information message to be transmitted. The MBMS is identified by the UE based on the acquired transmission group identifier using the transmission group identifier and the list of the transmission identifiers belonging to the transmission group stored in the UE (See FIG. 5). The UE then recognizes that the received scheduling information is for the identified MBMS.

In FIGS. 7-9, the messages including the transmission identifier and/or the service group identifier may also include transmission identifiers and/or service identifiers for other services which do not belong to the transmission group or the service group, instead of group identifiers.

Figure 10:
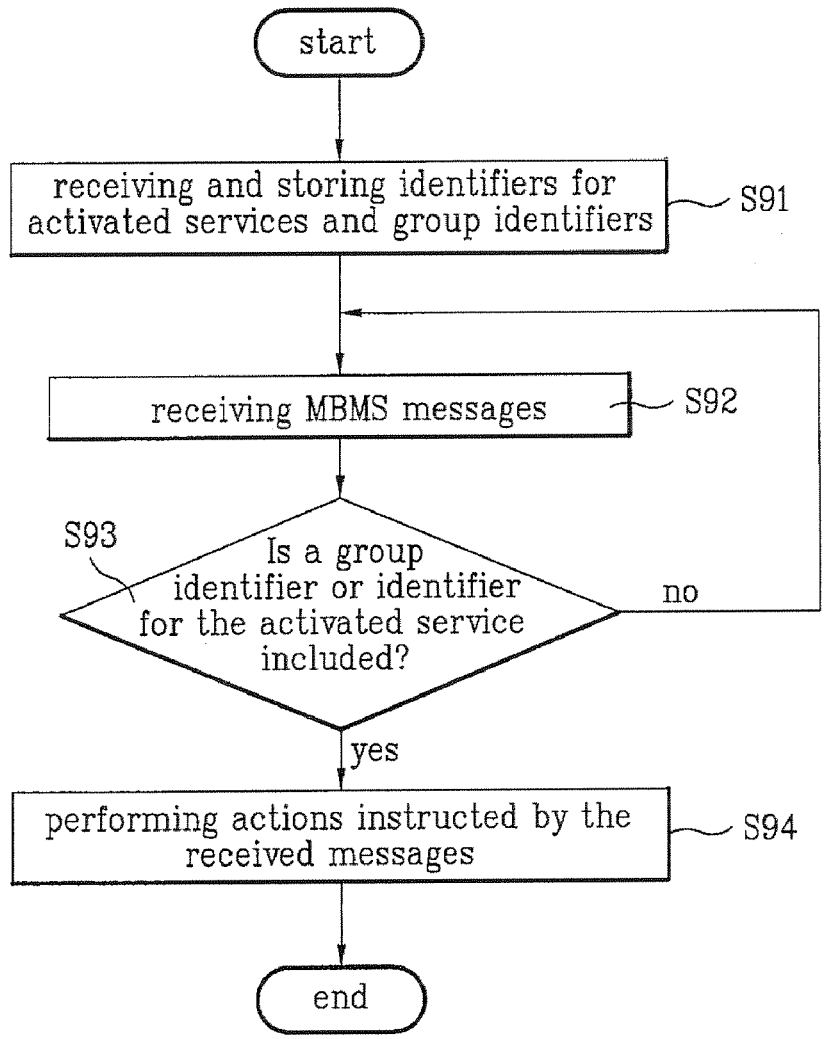
FIG. 10 is a flow diagram of a method in a UE, according to an embodiment of the present invention.

FIG. 10 is a flow diagram of a method in a UE, according to an embodiment of the present invention.

Referring to FIG. 10, the UE receives identifiers and group identifiers for MBMS services through an MCCH and stores at least one identifier and group identifier for at least one activated MBMS [S91]. The UE receives an RRC message via the MCCH [S92]. The UE checks whether the at least one identifier or group identifier is included in the RRC message [S93]. If not, S93 is repeated for the next RRC message. If the at least one identifier or group identifier is included in the RRC message, the UE performs actions instructed by the RRC message [S94].

Figure 11:
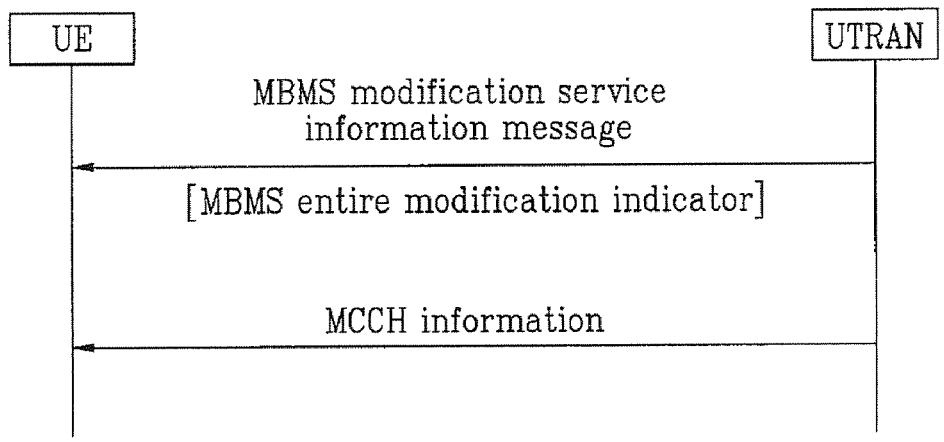
FIG. 11 is a diagram illustrating an MBMS entire modification indicator, according to an embodiment of the present invention.

FIG. 11 is a diagram illustrating an MBMS entire modification indicator, according to an embodiment of the present invention.

Figure 1:
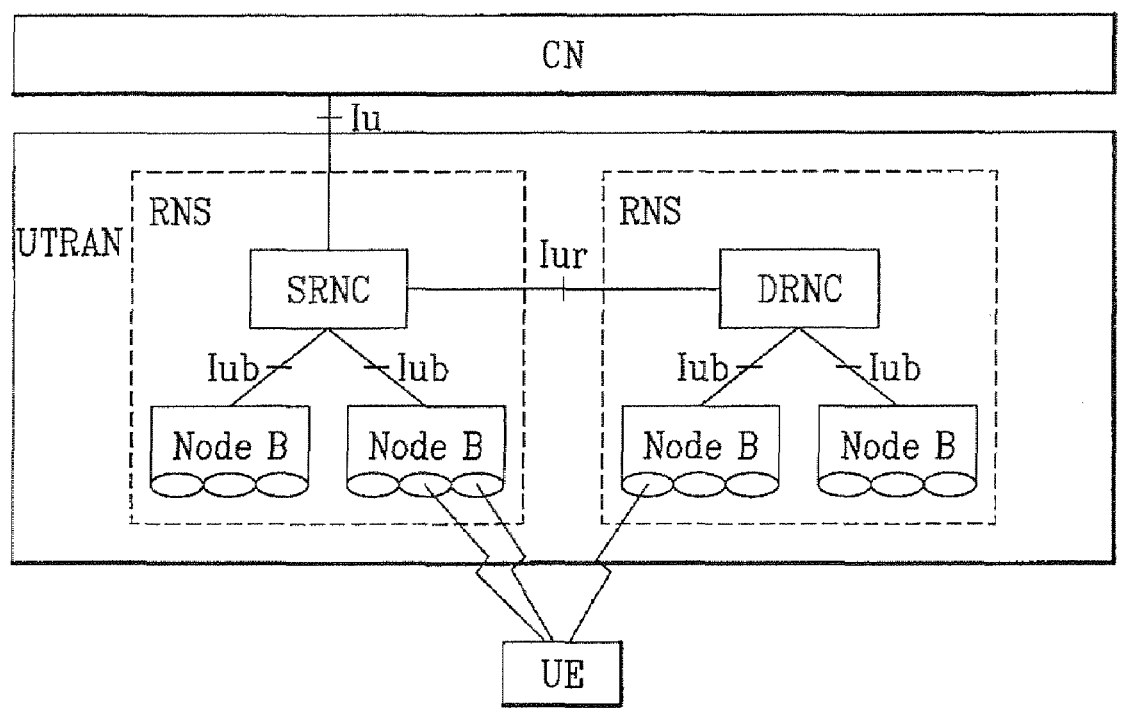
FIG. 1 is a block diagram illustrating an exemplary network structure of a universal mobile telecommunications system (UMTS).
Figure 2:
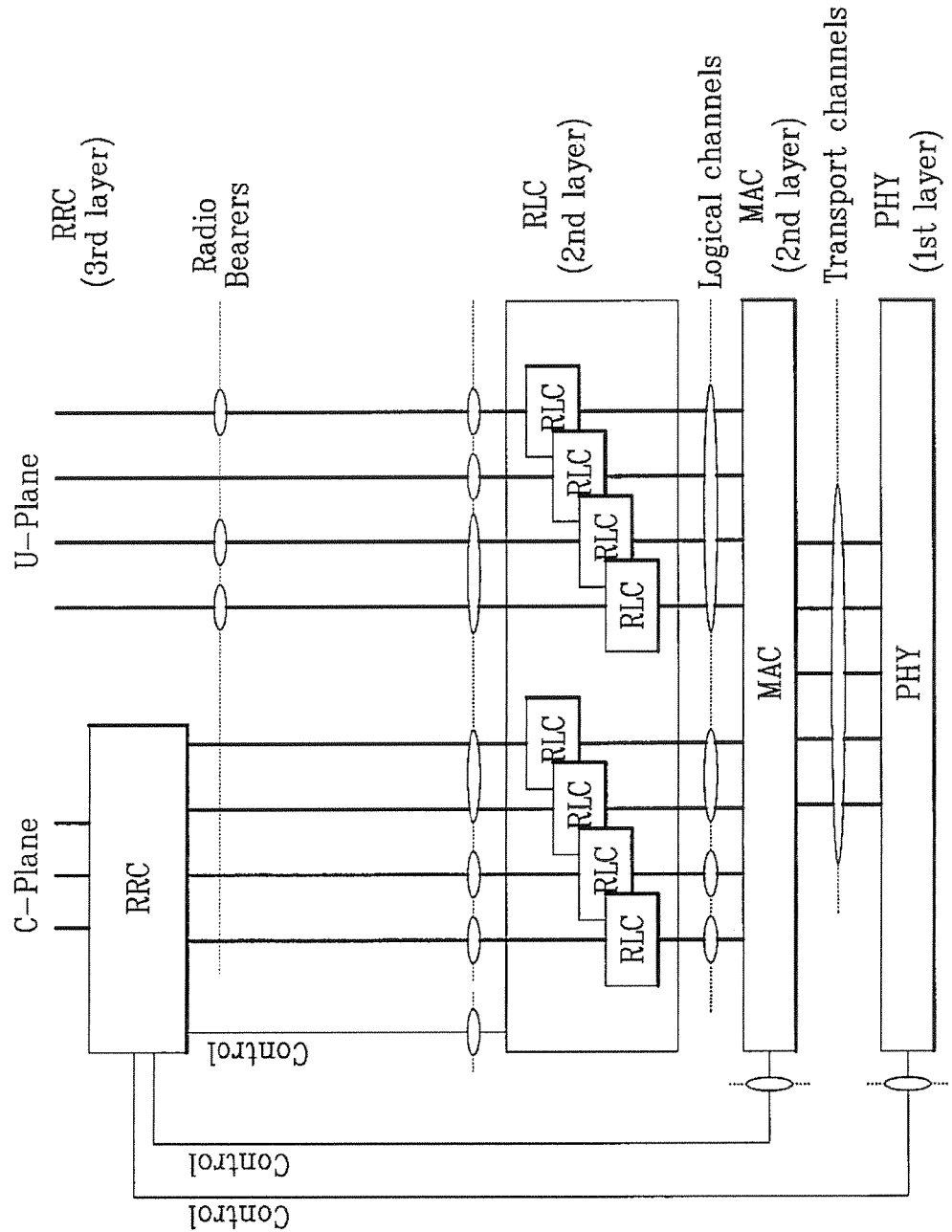
FIG. 2 is an architectural diagram illustrating a radio interface protocol between a UE (user equipment) and a UTRAN (UMTS terrestrial radio access network) based on the 3GPP (3rd Generation Partnership Project) radio access network specifications.
Figure 3:
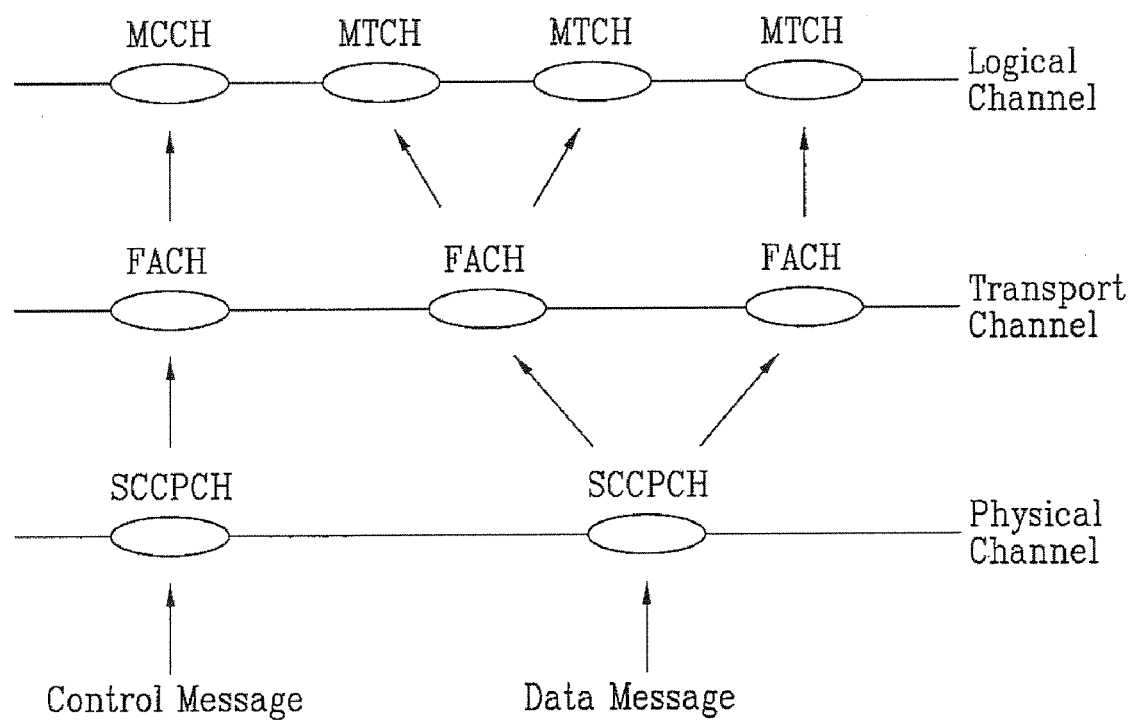
FIG. 3 is a diagram illustrating a channel mapping of logical, transport, and physical channels.
Figure 4:
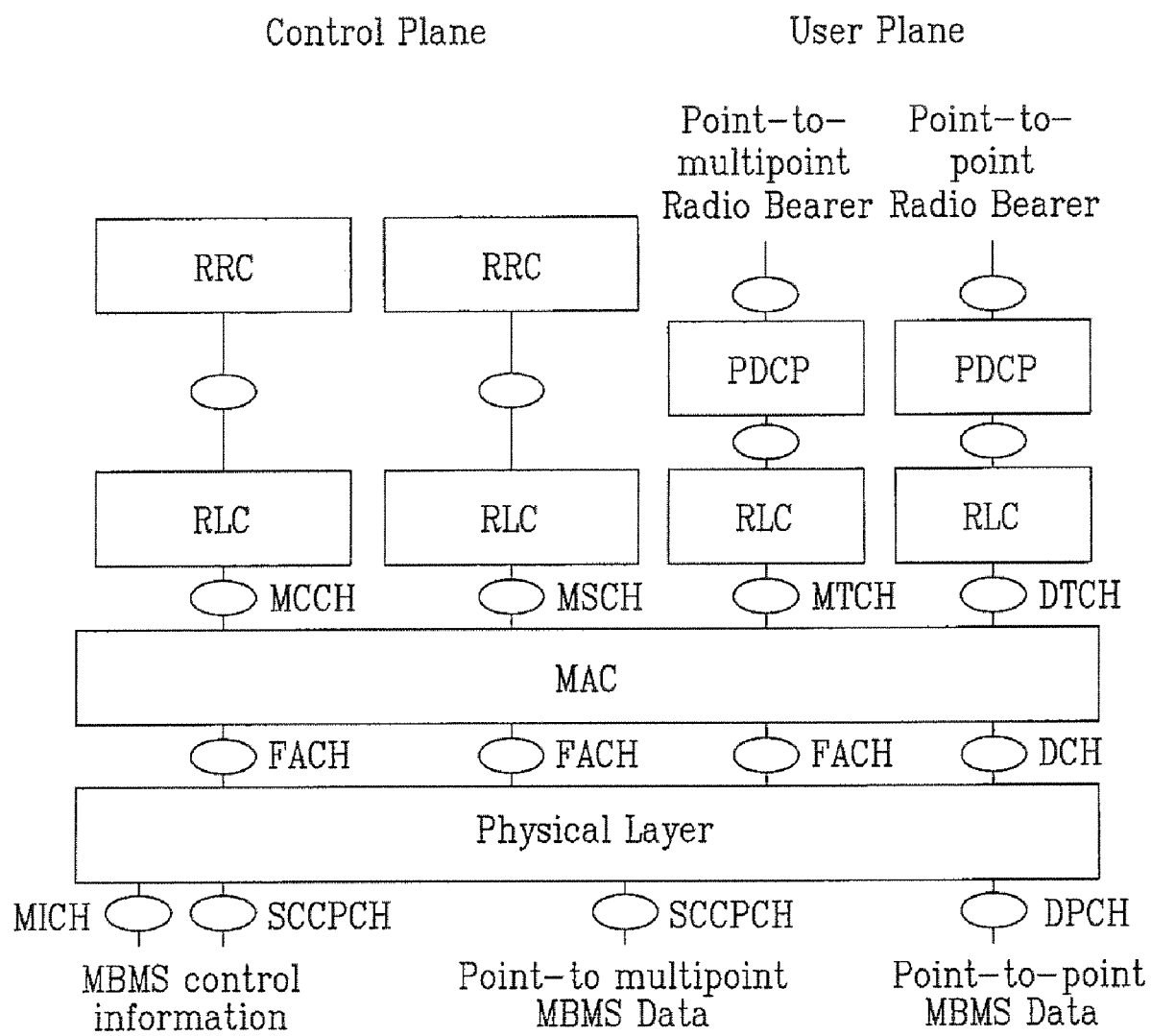
FIG. 4 is a diagram illustrating a channel configuration in a UE side for a multimedia broadcast/multicast service (MBMS).
Figure 5:
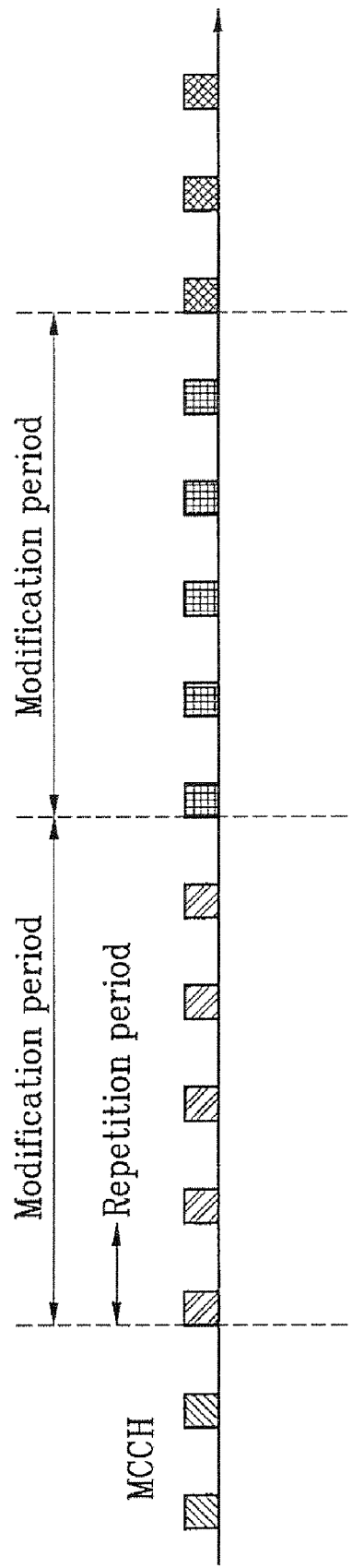
FIG. 5 is a diagram illustrating a transmission scheme of MCCH (MBMS control channel) information.

Referring to FIG. 1, the MBMS entire modification indicator informs all UEs receiving at least one MBMS service in a current cell of receiving a specific MCCH information or all MCCH information transmitted during a current modification period. The UTRAN may transmit the MBMS entire modification indicator when the MCCH information for all MBMS services, or at least a specified number of MBMS services, is modified. Preferably, since the UE receives an MBMS modification services information message in each modification period, the MBMS entire modification indicator may be transmitted through the MBMS modification services information.

Figure 12:
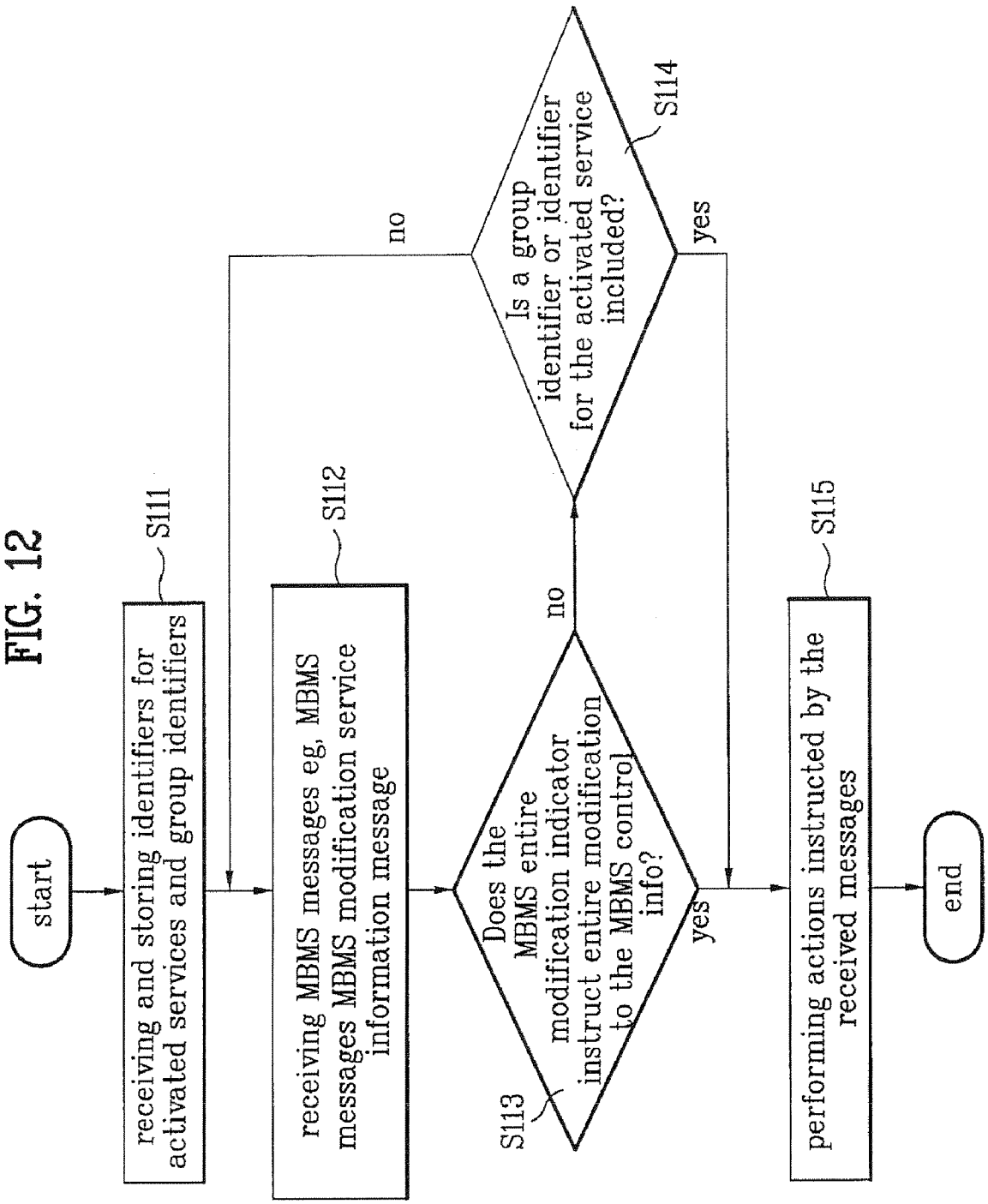
FIG. 12 is a flow diagram of a method in a UE, according to another embodiment of the present invention.

FIG. 12 is a flow diagram of a method in a UE, according to another embodiment of the present invention.

Referring to FIG. 12, the UE receives identifiers and group identifiers for MBMS services through an MCCH and stores at least one identifier and group identifier for at least one activated MBMS [S111]. The UE periodically receives an RRC message, such as an MBMS message, through an MCCH [S112]. The UE checks whether an MBMS entire modification indicator in the RRC message instructs entire modification [S113]. If the MBMS entire modification indicator instructs the entire modification, the UE performs the action instructed by the RRC message [S115]. If not, the UE checks whether the at least one identifier or group identifier for the activated services is included in the RRC message [S114]. If not, S112 is repeated for the next RRC message. If the at least one identifier or group identifier is included in the RRC message, the UE performs actions instructed by the RRC message [S115]. For example, when the entire modification indicator instructs the entire modification, the UE may receive the entire MCCH information during the modification period.

As described above, the present invention discloses a method of transmitting control information by grouping services, which enables a network to utilize radio resources efficiently in a mobile communications system comprising at least one user equipment (UE) and the network providing a plurality of services to the at least one user equipment. The plurality of services are mapped to a service group by the network and the at least one UE. When informing the at least one UE of control information for the plurality of services, the network provides a group identifier for identifying the service group. The at least one UE uses the group identifier for identifying the services with which the at least one UE is provided.

Various embodiments of a multicast/broadcast services information transmission are described below with reference to FIGS. 1-13.

A large number of MBMS services in MSI (modified services information) and USI (unmodified services information) messages may place a burden on the MCCH. Therefore, various embodiments are described below to address this issue.

Method 1: Transmission Group Identity

To avoid including several transmission identities in the MSI message, the transmission group identity is proposed as shown below in Table 1. The transmission group identity is used to identify all of the MBMS services provided on one physical channel or one preferred frequency. The transmission group identity may reduce the size of the MSI message when several services are updated together.

In such case, if the UE receives the transmission group identity relating to the activated service in the MSI, the UE may act based on the contents of the received MSI for the service. To this end, while performing the MCCH acquisition procedure, the UE needs to acquire the transmission group identity information. The MBMS transmission group identity may also be applied to the USI and the service scheduling message.

TABLE 1

MBMS Modified Services information

| Information Element/ Group name | Need | Multi | Type and reference | Semantics description |
|---|---|---|---|---|
| Message type | MP | | Message Type | |
| Modified service list | OP | 1 ... <max MBMS serv Modif> | | |
| >CHOICE MBMS Transmission identity option | | | | |
| >>Single identity | | | | |
| >>>MBMS Transmission identity | MP | | MBMS Transmission identity | Indicates a single MBMS services |
| >>Group identity | | | | |
| >>>MBMS | MP | | MBMS | Indicates a group |

TABLE 1-continued

MBMS Modified Services information

| Information Element/ Group name | Need | Multi | Type and reference | Semantics description |
|---|---|---|---|---|
| Transmission group identity | | | Transmission group identity | of MBMS services |
| >MBMS required UE action | MP | | Enumerated (None, Acquire counting info, Acquire PTM RB info, Establish PMM connection, Release PTM RB, Acquire MCCH) | Indicates required UE action upon receiving the message. When sent on the DCCH, only the following values apply: None (FLC), Acquire PTM RB info, Establish PMM connection). |
| >MBMS preferred frequency | OP | | | Indicates the frequency that UEs shall consider as the preferred frequency layer for cell re-selection during a session for an MBMS service the UE has joined, as specified in [25.304]. |
| >>PFL index | CV-MCCH | | Integer (1 ... <max MBMS-Freq>) | Index pointing to an entry in the list included in MBMS GENERAL INFORMATION. |
| >>PFL info | CV-DCCH | | Frequency info | |
| >Continue MCCH reading | MP | | BOOLEAN | MCCH in-band notification. Indicates whether or not the UE should continue reading MCCH in the next modification period. Not applicable when sent on the DCCH |
| End of modified MCCH information | OP | | Integer ( ) | Final TTI including MCCH messages with different content than in the previous modification period |

TABLE 2

MBMS Transmission Group Identity
The MBMS transmission group identity shown below includes information that identifies MBMS services provided on the identified channel or the identified frequency.

| Information element/Group name | Need | Multi | Type and reference | Semantics description |
|---|---|---|---|---|
| MBMS Transmission group identity | MP | | Integer (1 ... 32) | |
| >CHOICE Grouping method | | | | |
| >>Services on current cell SCCPCH | | | | |
| >>>Current cell S-CCPCH identity | MP | | MBMS Current cell S-CCPCH identity | |
| >>Services on neighboring cell SCCPCH | | | | |
| >>>Neighboring cell S-CCPCH identity | MP | | Integer (1 ... <maxS-CCPCH>) | Index pointing to an entry in the Neighboring cell's S-CCPCH list included in MBMS Neighboring Cell p-t-m rb Information. |
| >>Services on preferred frequency | | | | |
| >>>MBMS preferred frequency | | | Integer (1 ... <maxMBMS-Freq>) | Index pointing to an entry in the MBMS preferred frequency list included in MBMS preferred frequency information. |

Method 2: Indication of Services

It should be noted that some changes may affect all of the MBMS services available in a cell. For instance, if MICH configuration is changed, every UE that has activated an MBMS service should receive the reconfigured MICH information. If there is only one SCCPCH carrying MTCH of which information is reconfigured, then all MBMS UEs in a cell are required to read the reconfigured information. In such case, reading MCCH to all of MBMS UEs in the cell may be indicated.

TABLE 3

MBMS Modified Services information

| Information Element/Group name | Need | Multi | Type and reference | Semantics description |
|---|---|---|---|---|
| Message type | MP | | Message Type | |
| Modified service list | OP | 1 ... <max MBMS serv Modif> | | |
| >CHOICE MBMS Transmission identity option | | | | |
| >>Single identity | | | | |
| >MBMS Transmission identity | MP | | MBMS Transmission identity | Indicates a single MBMS services |
| >>All | | | | |
| >>>None | | | (No data) | Indicates all MBMS services available in the current cell |
| >MBMS required UE action | MP | | Enumerated (None, Acquire counting info, Acquire PTM RB info, Establish PMM connection, Release PTM RB, Acquire MCCH) | Indicates required UE action upon receiving the message. When sent on the DCCH, only the following values apply: None (FLC), Acquire PTM RB info, Establish PMM connection). |
| >MBMS preferred frequency | OP | | | Indicates the frequency that UEs shall consider as the preferred frequency layer for cell re-selection during a session for an MBMS service the UE has joined, as specified in [25.304]. |
| >>PFL index | CV-MCCH | | Integer (1 ... <max MBMS-Freq>) | Index pointing to an entry in the list included in MBMS GENERAL INFORMATION. |
| >>PFL info | CV-DCCH | | Frequency info | |
| >Continue MCCH reading | MP | | BOOLEAN | MCCH in-band notification. Indicates whether or not the UE should continue reading MCCH in the next modification period. Not applicable when sent on the DCCH |
| End of modified MCCH information | OP | | Integer ( ) | Final TTI including MCCH messages with different content than in the previous modification period |

Method 3: Change Indication on MSCH as well as MSI

While receiving an MBMS service provided ptm RB, the UE may check MSCH as well as MCCH. In such case, the UTRAN may indicate an update of MCCH information by using MSCH for an ongoing MBMS service and by using the MSI on MCCH for the start of MBMS services. Accordingly, the UTRAN may alleviate the signalling burden on MSI for ongoing MBMS services.

change of MICH configuration information, a change of MSCH configuration information, a change of SCCPCH information for a current cell or neighboring cells, and/or a change of MBMS preferred frequency information.

Since the MBMS transmission identity may be large, an update of several services may burden MCCH transmission. Thus, reducing burden on MSI (Modified Services Information) messages through optimization is desired. Furthermore,

TABLE 4

MBMS Scheduling Information

| Information Element/Group name | Need | Multi | Type and reference | Semantics description |
|---|---|---|---|---|
| Message type | MP | | Message Type | |
| Service scheduling info list | MP | 1 to <max MBMS serv Sched> | | |
| >MBMS Service identity | MP | | MBMS Service identity | |
| >Read MCCH | OP | | Boolean | TRUE indicates that the UE shall receive the MBMS UNMODIFIED SERVICES INFORMATION message on MCCH from the coming repetition period. |
| >MBMS Service transmissions info list | OP | 1 to <max MBMS Transmis> | | One or more sets of scheduling information comprising of the beginning and duration of a transmission |
| >>Start | MP | | Integer (1 ... X) | |
| >>Duration | MP | | Integer (1 ... X) | |
| >Next scheduling period | MP | | Integer (1 ... 32) | Indicates the next scheduling period that may include information for the concerned service. In case UTRAN is certain no data will be transmitted for several scheduling periods, it may signal a value higher than 1 |

While receiving MTCH, the UE is required to periodically read not only the MSI but also the MSCH message. Thus, on one hand, the UE may act based on the received MSCH message for the services on SCCPCH that the UE is receiving. On the other hand, the UE may act based on the received MSI message for the other services. This option does not impair UE reception of the MSI message. Rather, it may allow additional interpretation of the MSCH message.

The MBMS transmission group identity may be introduced to the MSI and the USI message (as well as other MBMS messages), as described above in method 1. Additionally, a simple indication may be provided for all services in the MSI, as described above in method 2. Furthermore, a one-bit change indication may be applied on the MSCH message, as described above in method 3.

Another embodiment of multicast/broadcast services information transmission is described below.

If there are many services available in a cell, the size of the MBMS services information message increases. Thus, optimization of MBMS services information messages is described below.

By changing one parameter value, an update of MCCH information for several services related to the parameter may be performed. For example, such an update may result from a change of MBMS L1 combining schedule information, a MCCH rate may be reduced by dividing the USI (Unmodified Services Information) message when many services are available in a cell.

Transmission Group Identity

To avoid including several transmission identities in the MSI message, the transmission group identity shown below in Table 5 may be used. The transmission group identity identifies MBMS services provided on one physical channel or one preferred frequency. The transmission group identity may reduce the size of the MSI message when several services are updated together.

TABLE 5

MBMS Modified Services Information

| Information Element/Group name | Need | Multi | Type and reference | Semantics description |
|---|---|---|---|---|
| Message type | MP | | Message Type | |
| Modified service list | OP | 1 ... <max MBMS serv Modif> | | |
| >CHOICE MBMS Transmission identity option | | | | |

TABLE 5-continued

MBMS Modified Services Information

| Information Element/Group name | Need | Multi | Type and reference | Semantics description |
|---|---|---|---|---|
| >>Single identity | | | | |
| >>>MBMS Transmission identity | MP | | MBMS Transmission identity | Indicates a single MBMS services |
| >>Group identity | | | | |
| >>>MBMS Transmission group identity | MP | | MBMS Transmission group identity | Indicates a group of MBMS services |
| >MBMS required UE action | MP | | Enumerated (None, Acquire counting info, Acquire PTM RB info, Establish PMM connection, Release PTM RB) | Indicates required UE action upon receiving the message. When sent on the DCCH, only the following values apply: None (FLC), Acquire PTM RB info, Establish PMM connection). |
| >MBMS preferred frequency | OP | | | Indicates the frequency that UEs shall consider as the preferred frequency layer for cell re-selection during a session for an MBMS service the UE has joined, as specified in [25.304]. |
| >>PFL index | CV-MCCH | | Integer (1 . . . <max MBMS-Freq>) | Index pointing to an entry in the list included in MBMS GENERAL INFORMATION. |
| >>PFL info | CV-DCCH | | Frequency info | |
| >Continue MCCH reading | MP | | BOOLEAN | MCCH in-band notification. Indicates whether or not the UE should continue reading MCCH in the next modification period. Not applicable when sent on the DCCH |
| MBMS re-acquire MCCH | MP | | BOOLEAN | |
| End of modified MCCH information | OP | | Integer (1 . . . 15) | Final TTI including MCCH messages with different content than in the previous modification period |

TABLE 6

MBMS Transmission Group Identity
The MBMS transmission group identity shown below includes information that identifies MBMS services provided on the identified channel, cell or frequency.

| Information element/Group name | Need | Multi | Type and reference | Semantics description |
|---|---|---|---|---|
| CHOICE Grouping method | | | | |
| >All services on current cell SCCPCH | | | | |
| >>Current cell S-CCPCH identity | MP | | MBMS Current cell S-CCPCH identity | |
| >All services on neighboring cell SCCPCH | | | | |
| >>Neighboring cell S-CCPCH identity | MP | | Integer (1 . . . <maxSCCPCH>) | Index pointing to an entry in the Neighboring cell's S-CCPCH list included in MBMS Neighboring Cell p-t-m rb Information. |
| >All services on neighboring cell | | | | |
| >>Neighboring cell identity | MP | | Integer (1 . . . X) | Assumption is to use a short index e.g., pointer to SIB 11/12 |
| >All services on preferred frequency | | | | |
| >>MBMS preferred frequency | MP | | Integer (1 . . . <maxMBMS-Freq>) | Index pointing to an entry in the MBMS preferred frequency list included in MBMS preferred frequency information. |

If the UE is tracking MCCH information within a cell, the UE may interpret transmission group identities on the MSI message using other MCCH information, such as the MBMS CURRENT CELL P-T-M RB INFORMATION message or the MBMS NEIGHBORING CELL P-T-M RB INFORMATION message, for example. Then, if the UE finds that the transmission group identity is related to the activated service, the UE may act based on the contents of the received MSI for the service.

On the other hand, when a transmission group identity is used in the MSI (modified services information) message, information about all services belonging to the transmission group may be included in the USI (unmodified services information) message, because all available MBMS service identities may be broadcast in a modification period to support UEs that come from other cells. Thus, if UEs come from other cells, the UEs may interpret the transmission group identity after receiving USI as well as MSI messages.

TABLE 7

MBMS Unmodified Services Information

| Information Element/Group name | Need | Multi | Type and reference | Semantics description |
|---|---|---|---|---|
| Message type | MP | | Message Type | |
| Unmodified services list | OP | 1 to <maxMBMSservUnmodif> | | |
| >MBMS Transmission identity | MP | | MBMS Transmission identity | |
| >MBMS required UE action | MP | | Enumerated (None, Acquire PTM RB info, Establish PMM connection) | Indication of the UE action required to receive the service: |
| >MBMS preferred frequency | OP | | Integer (1 ... <maxMBMS-Freq>) | Information about the frequency that UEs shall consider as the preferred frequency layer for cell re-selection during a session for an MBMS service the UE has joined, as specified in [25.304]. Index pointing to an entry in the list included in MBMS GENERAL INFORMATION |
| List of services on Transmission Group identities | CV-Trans GroupId | 1 ... <max MBMS serv Modif> | | List all of services belonging to all of MBMS Transmission Group Identities included in the MBMS MODIFIED SERVICES INFORMATION message for the modification period in which this message is transmitted. |
| >MBMS Transmission identity | MP | | MBMS Transmission identity | |

| Condition | Explanation |
|---|---|
| TransGroupId | This IE is mandatory present if the IE "MBMS Transmission group identity" is included in the MBMS MODIFIED SERVICES INFORMATION message for the modification period in which this message is transmitted. Otherwise it is not needed. |

Instead of USI, a services information message called the MBMS SERVICE GROUP INFORMATION message, for example, may carry the list of services on transmission group identities included in the MSI message, as shown below in Table 8. The message may be transmitted in the same way as an MSI or USI message. The UE entering a new cell receives the message to acquire the grouping information. However, the UE tracking MCCH information in a cell does not need to receive the message.

TABLE 8

MBMS Services Group Information

| Information Element/Group name | Need | Multi | Type and reference | Semantics description |
|---|---|---|---|---|
| Message type | MP | | Message Type | |
| List of services on Transmission Group identities | MP | 1 ... <max MBMS serv Modif> | | List all of services belonging to all of MBMS Transmission Group Identities included in the MBMS MODIFIED SERVICES INFORMATION message for the modification period in which this message is transmitted. |
| >MBMS Transmission identity | MP | | MBMS Transmission identity | |

Indication of all MBMS UEs

It should be noted that some changes may affect all MBMS UEs in a cell. For example, if MICH configuration is changed, every UE that has activated an MBMS service needs to receive the reconfigured MICH information. If there is only one SCCPCH carrying MTCH of which information is reconfigured, then all MBMS UEs in a cell are required to read the reconfigured information. In such case, reading MCCH to all of MBMS UEs in the cell may be indicated, as part of a transmission group identity, as shown below in Table 9.

TABLE 9

MBMS Transmission Group Identity
The MBMS transmission group identity includes information that identifies the MBMS services provided on the identified channel, cell or frequency.

| Information element/Group name | Need | Multi | Type and reference | Semantics description |
|---|---|---|---|---|
| CHOICE Grouping method | | | | |
| >All services on current cell SCCPCH | | | | |
| >>Current cell S-CCPCH identity | MP | | MBMS Current cell S-CCPCH identity | |
| >All services on neighboring cell SCCPCH | | | | |
| >>Neighboring cell S-CCPCH identity | MP | | Integer (1 ... <maxS-CCPCH>) | Index pointing to an entry in the Neighboring cell's S-CCPCH list included in MBMS Neighboring Cell p-t-m rb Information. |
| >All services on neighboring cell | | | | |
| >>Neighboring cell identity | MP | | Integer (1 ... X) | Assumption is to use a short index e.g. pointer to SIB 11/12 |
| >All services on preferred frequency | | | | |
| >>MBMS preferred frequency | MP | | Integer (1 ... <maxMBMS-Freq>) | Index pointing to an entry in the MBMS preferred frequency list included in MBMS preferred frequency information. |
| >All | | | | |
| >>None | | | (No data) | Indicates all UEs that has activated an MBMS service |

Division of Unmodified Services Information Message

To reduce the burden on the USI, the MCCH rate may be increased and/or the length of MCCH modification/repetition period may be extended. However, increasing MCCH rate may waste UTRAN and UE resources. Furthermore, a longer MCCH period may result in slower modification of MCCH information and longer MCCH acquisition time. Therefore, available services may be divided into multiple service groups. The service groups may then be transmitted in order, in their own modification period, as shown below in Table 1.

For example, as shown in Table 10, there are three service groups (SGs): SG1 (blue), SG2 (violet), and SG3 (red). The SG1 group consists of services 1 to 5, the SG2 group consists of services 6 to 10, and the SG3 group includes services 11 to 14. A service may be randomly allocated to a service group, for example. Referring again to Table 10, from a specific modification period (MP) (e.g., MP#1 in Table 10), each group is regularly transmitted with a length of three MPs. Thus, if a UE entering a new cell wishes to acquire all service info, the UE must receive USI messages for three consecutive MPs from all MPs.

TABLE 10

Division of Services Information into USI messages when MCCH Information is not modified.

| | Modification Period | | | | | |
|---|---|---|---|---|---|---|
| | MP#1 | MP#2 | MP#3 | MP#4 | MP#5 | MP#6 |
| MSI | — | — | — | — | — | — |
| USI | Service 1 Service 2 Service 3 Service 4 Service 5 | Service 6 Service 7 Service 8 Service 9 Service 10 | Service 11 Service 12 Service 13 Service 14 | Service 1 Service 2 Service 3 Service 4 Service 5 | Service 6 Service 7 Service 8 Service 9 Service 10 | Service 11 Service 12 Service 13 Service 14 |

In the method, regardless of division of service information in USI, the MSI message transmits services information according to the current specifications. In other words, even with divided unmodified service info, service modification may be done at each MP.

For example, referring to Table 2 below, when MCCH info for service 8 belonging to the SG2 (violet) group is modified at MP#1, information on service 8 is transmitted at MSI of MP#1 that is for the SG1 (blue) group. Thus, when a service changes at a particular MP, services information for the service may be transmitted at MSI of the MP in which the service changes, according to the current operation of MSI.

TABLE 11

Division of Services Information into USI messages when MCCH Information is modified.

| | Modification Period | | | | | |
|---|---|---|---|---|---|---|
| | MP#1 | MP#2 | MP#3 | MP#4 | MP#5 | MP#6 |
| MSI | Service 2 Service 8 | Service 2 Service 3 Service 5 | Service 11 Service 14 | Service 10 Service 12 | — | Service 8 Service 12 |
| USI | Service 1 Service 3 Service 4 Service 5 | Service 6 Service 7 Service 8 Service 9 Service 10 | Service 12 Service 13 | Service 1 Service 2 Service 3 Service 4 Service 5 | Service 6 Service 7 Service 8 Service 9 Service 10 | Service 11 Service 13 Service 14 |

As stated above, when the number of available services increases in a cell, the MCCH rate may increase and/or the MP length may increase. According to the above method, when many services arrive, the MCCH rate may be lowered and the MP length may remain constant.

Table 12 below shows the change to the USI message. Each USI message may contain services information for a particular service group, and the UE does not need to know to which service group a service belongs. The UE must only find the number of consecutive MPs necessary for acquiring all USI and to read MCCH for the consecutive MPs, when the UE enters a cell. The number of consecutive MPs is signaled on each USI message as shown in the table below. Once the UE acquires all service information by receiving MCCH for the consecutive MPs, the UE may receive only MSI and update service info by the received MSI as usual.

antenna 440, a battery 455, a display 415, a keypad 420, a storage unit 430 such as flash memory, ROM or SRAM, a speaker 445 and a microphone 450.

A user enters instructional information, such as a telephone number, for example, by pushing the buttons of a keypad 420 or by voice activation using the microphone 450. The processing unit 410 receives and processes the instructional information to perform the appropriate function, such as to dial the telephone number. Operational data may be retrieved from the storage unit 430 to perform the function. Furthermore, the processing unit 410 may display the instructional and operational information on the display 415 for the user's reference and convenience.

TABLE 12

MBMS Unmodified Services Information

| Information Element/Group name | Need | Multi | Type and reference | Semantics description |
|---|---|---|---|---|
| Message type | MP | | Message Type | |
| Length of Services Information Transmission | MP | | Integer (1...8) | Indicates number of consecutive modification periods to acquire all of MCCH information in a cell. |
| Unmodified services list | OP | 1 to <max MBMS servUnmodif> | | |
| >MBMS Transmission identity | MP | | MBMS Transmission identity | |
| >MBMS required UE action | MP | | Enumerated (None, Acquire PTM RB info, Establish PMM connection) | Indication of the UE action required to receive the service: |
| >MBMS preferred frequency | OP | | Integer (1 ... <maxMBMS-Freq>) | Information about the frequency that UEs shall consider as the preferred frequency layer for cell re-selection during a session for an MBMS service the UE has joined. Index pointing to an entry in the list included in MBMS GENERAL INFORMATION |

As stated above, a large number of MBMS services (e.g. low-rate services) may burden the MSI message. Since most of MBMS UEs need to receive the MSI message at every modification period, large MSI messages are not desirable, especially on the UE side. Accordingly, the MBMS transmission group identity may be introduced to reduce the size of the MSI message to reduce the signalling burden on the MSI. Furthermore, a simple indication for all UEs may be provided in the MSI, also to reduce the signalling burden on the MSI. Additionally, services included in the USI message may be divided to benefit the USI.

Figure 13:
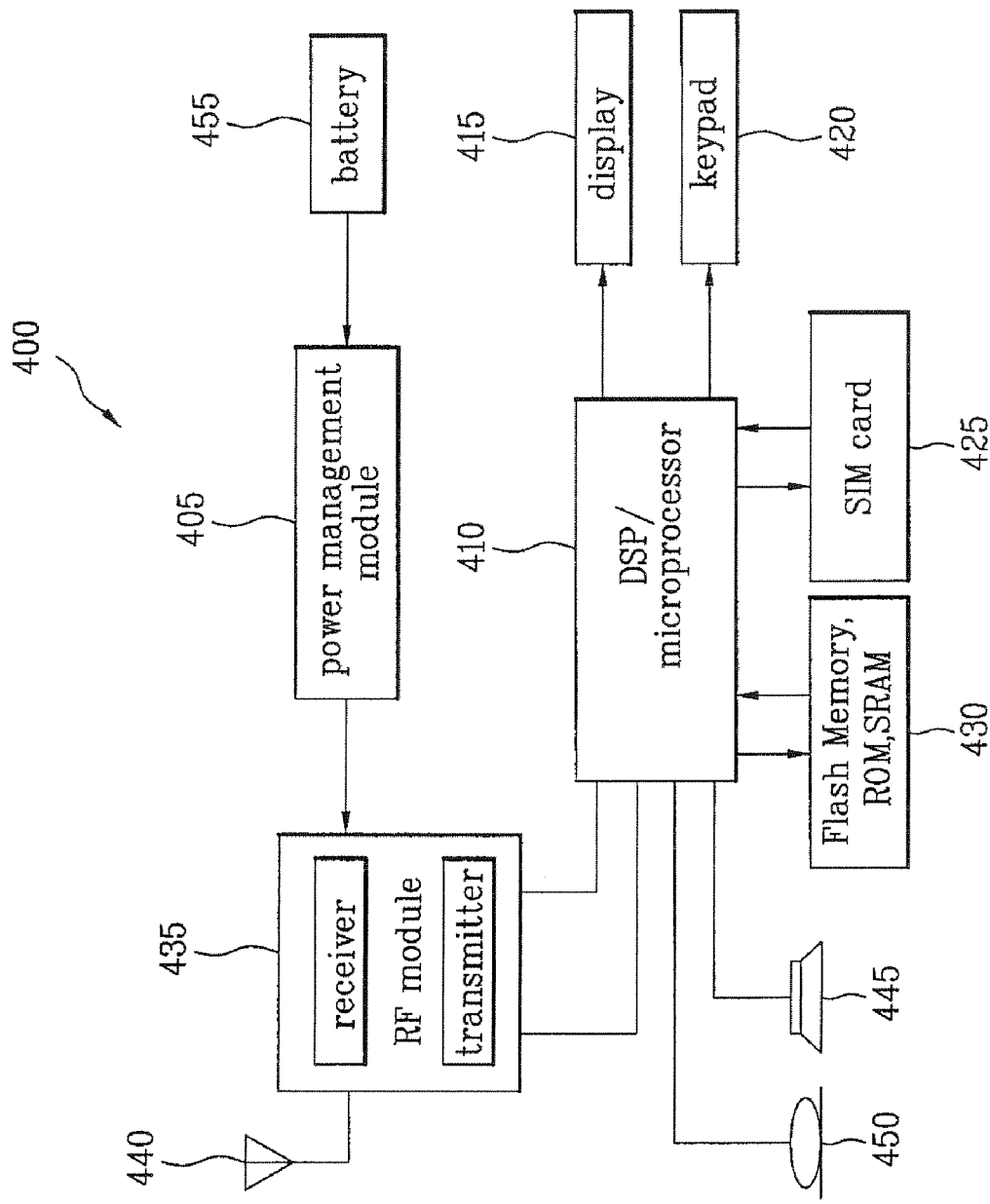
FIG. 13 is a diagram illustrating an exemplary user equipment (UE).

FIG. 13 is a diagram illustrating an exemplary mobile communication device 400, such as a user equipment (UE) that may be used in performance of various techniques of the present invention.

Referring to FIG. 13, a block diagram of the mobile communication device 400 is illustrated, for example a mobile phone for performing the methods of the present invention. The mobile communication device 400 includes a processing unit 410 such as a microprocessor or digital signal processor, an RF module 435, a power management module 405, an The processing unit 410 issues instructional information to the RF module 435, to initiate communication, for example, transmit radio signals comprising voice communication data. The RF module 435 comprises a receiver and a transmitter to receive and transmit radio signals. The antenna 440 facilitates the transmission and reception of radio signals. Upon receiving radio signals, the RF module 435 may forward and convert the signals to baseband frequency for processing by the processing unit 410. The processed signals would be transformed into audible or readable information outputted via the speaker 445, for example.

The processing unit 410 is adapted to store message history data of messages received from and messages transmitted to other users in the storage unit 430, receive a conditional request for message history data input by the user, process the conditional request to read message history data corresponding to the conditional request from the storage unit, and utput the message history data to the display unit 415. The storage unit 430 is adapted to store message history data of the received messages and the transmitted messages.

In one embodiment, a method of communicating a point-to-multipoint service in a wireless communication system comprises receiving through a control channel a first message comprising a first point-to-multipoint service group identifier associated with a first plurality of point-to-multipoint services for a predetermined area. The method also comprises receiving a second message through the control channel comprising a list of point-to-multipoint service identifiers associated with the first point-to-multipoint service group identifier. The method also comprises processing according to control information received through the control channel if the list of point-to-multipoint service identifiers comprises at least one service that a user equipment is subscribed to.

The control channel may be a point-to-multipoint control channel. The first message may comprise a list of point-to-multipoint services associated with modified control information. The second message may comprise a list of point-to-multipoint services associated with unmodified control information. The second message may further comprise a list of point-to-multipoint services associated with modified control information, wherein the list of point-to-multipoint services is associated with the first point-to-multipoint service group identifier. The step of processing according to control information received through the control channel may comprise performing processes determined by the at least one of the first and the second messages. At least one of the first plurality of point-to-multipoint services may be a multimedia broadcast/multicast service (MBMS). The control channel may comprise a MBMS control channel (MCCH). A service group associated with the first point-to-multipoint service group identifier may comprise at least one MBMS transmitted on a carrier frequency, wherein the first point-to-multipoint service group identifier corresponds to an identifier of the carrier frequency. Alternatively, a service group associated with the first point-to-multipoint service group identifier may comprise at least one MBMS using a first set of parameters, wherein the first point-to-multipoint service group identifier corresponds to an identifier of the first set of parameters.

In another embodiment, a method of transmitting a point-to-multipoint service in a wireless communication system comprises transmitting through a control channel a first message comprising a first point-to-multipoint service group identifier associated with a first plurality of point-to-multipoint services for a predetermined area. The method also comprises transmitting a second message through the control channel comprising a list of point-to-multipoint service identifiers associated with the first point-to-multipoint service group identifier so that a user equipment carries out processes according to control information received through the control channel if the list of point-to-multipoint service identifiers includes at least one service that a user equipment is subscribed to.

In yet another embodiment, a mobile station for communicating a point-to-multipoint service in a wireless communication system comprises a receiver adapted to receive through a control channel a first message comprising a first point-to-multipoint service group identifier associated with a first plurality of point-to-multipoint services for a predetermined area, and to receive a second message through the control channel comprising a list of point-to-multipoint service identifiers associated with the first point-to-multipoint service group identifier. The mobile station also comprises a processor adapted to process according to control information received through the control channel if the list of point-to-multipoint service identifiers comprises at least one service that a user equipment is subscribed to.

In still another embodiment, a network for transmitting a point-to-multipoint service in a wireless communication system comprises a transmitter adapted to transmit through a control channel a first message comprising a first point-to-multipoint service group identifier associated with a first plurality of point-to-multipoint services for a predetermined area, and to transmit a second message through the control channel comprising a list of point-to-multipoint service identifiers associated with the first point-to-multipoint service group identifier so that a user equipment carries out processes according to control information received through the control channel if the list of point-to-multipoint service identifiers includes at least one service that a user equipment is subscribed to.

In yet another embodiment, a method of communicating a point-to-multipoint service in a wireless communication system comprises receiving through a control channel a first point-to-multipoint service group identifier that is associated with a first plurality of activated point-to-multipoint services for a network, and receiving a point-to-multipoint service using a first control information. The method also comprises receiving a point-to-multipoint service message comprising at least one of modification service information message and non-modification service information message, wherein the point-to-multipoint service message includes a second point-to-multipoint service group identifier associated with a second plurality of activated point-to-multipoint services and modified control information associated with the second plurality of activated point-to-multipoint services. The method also comprises modifying the first control information of the point-to-multipoint service in response to the modified control information if the second point-to-multipoint service group identifier is associated with the point-to-multipoint service being received by the mobile station.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method of receiving information at a user equipment (UE) for at least one multimedia broadcast/multicast service (MBMS) using a modified services information (MSI) message and an unmodified services information (USI) message, the method comprising:

receiving, an indicator indicating a group of modified MBMS services included in the modified services information (MSI) message through a control channel;

receiving, through the control channel, modified information related to the group of modified MBMS services in the unmodified services information (USI) message, if the indicator indicating the group of modified MBMS services is included in the modified services information (MSI) message; and receiving MBMS data using the modified information in the unmodified services information (USI) message.

2. The method of claim 1, wherein the control channel is a point-to-multipoint control channel.

3. The method of claim 1, wherein the control channel is a MBMS contol channel (MCCH).

4. The method of claim 1, wherein the modified services information (MSI) message comprises a list of MBMS services associated with modified control information.

5. A method of transmitting information at a network for at least one multimedia broadcast/multicast service (MBMS)

using a modified services information (MSI) message and an unmodified services information (USI) message, the method comprising:

transmitting, through a control channel, an indicator indicating a group of modified MBMS services in the modified services information (MSI) message; and transmitting, through the control channel, modified information related to the group of modified MBMS services indicated by the indicator in the unmodified services information (USI) message so that a user equipment (UL) carries out processes according to the modified information received through the control channel, wherein the user equipment utilizes the modified information in the unmodified services information (USI) message to receive MBMS data.

6. The method of claim 5, wherein the control channel is a point-to-multipoint control channel.

7. The method of claim 5, wherein the control channel is a MBMS control channel (MCCH).

8. The method of claim 5, wherein the modified services information (MSI) message comprises a list of MBMS services associated with modified control information.

* * * * *